(12) United States Patent
Zhao et al.

(10) Patent No.: US 10,419,623 B2
(45) Date of Patent: Sep. 17, 2019

(54) MEASURING APPARATUS AND PRINTING APPARATUS

(71) Applicant: SEIKO EPSON CORPORATION, Tokyo (JP)

(72) Inventors: Danjun Zhao, Shiojiri (JP); Tetsuo Tatsuda, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/900,157

(22) Filed: Feb. 20, 2018

(65) Prior Publication Data

US 2018/0241888 A1 Aug. 23, 2018

(30) Foreign Application Priority Data

Feb. 21, 2017 (JP) .................................. 2017-029696
Oct. 23, 2017 (JP) .................................. 2017-204205

(51) Int. Cl.
*H04N 1/00* (2006.01)
*H04N 1/10* (2006.01)
*H04N 1/64* (2006.01)
*H04N 1/60* (2006.01)

(52) U.S. Cl.
CPC ....... *H04N 1/00034* (2013.01); *H04N 1/0009* (2013.01); *H04N 1/00015* (2013.01); *H04N 1/00045* (2013.01); *H04N 1/0083* (2013.01); *H04N 1/00336* (2013.01); *H04N 1/1039* (2013.01); *H04N 1/6044* (2013.01); *H04N 1/64* (2013.01)

(58) Field of Classification Search
None
See application file for complete search history.

(56) References Cited

U.S. PATENT DOCUMENTS

| | | | | |
|---|---|---|---|---|
| 6,353,485 | B1* | 3/2002 | Kaneko | H04N 1/00538 346/140.1 |
| 6,371,586 | B1* | 4/2002 | Saruta | B41J 2/17513 347/19 |
| 9,469,104 | B2* | 10/2016 | Fukuda | B41J 2/04588 |
| 2002/0180851 | A1* | 12/2002 | Saruta | B41J 2/17546 347/86 |
| 2005/0024406 | A1* | 2/2005 | Otsuki | B41J 11/008 347/14 |
| 2005/0200917 | A1* | 9/2005 | Kanesaka | G03B 27/62 358/486 |
| 2006/0092202 | A1* | 5/2006 | Tamura | B41J 2/04581 347/10 |

(Continued)

FOREIGN PATENT DOCUMENTS

JP 2008-229952 A 10/2008

*Primary Examiner* — Anh-Vinh T Nguyen
(74) *Attorney, Agent, or Firm* — Foley & Lardner LLP

(57) ABSTRACT

A measuring apparatus includes a carriage on which an imaging control section that controls imaging of an object is mounted, a movement control section that moves the carriage relative to the object, an image processing section that acquires image information, a first signal line that connects the imaging control section and the movement control section to each other, and a second signal line that connects the imaging control section and the image processing section to each other. A control signal is transmitted over the first signal line, and a data signal is transmitted over the second signal line.

20 Claims, 6 Drawing Sheets

(56) References Cited

U.S. PATENT DOCUMENTS

| | | | |
|---|---|---|---|
| 2007/0081181 A1* | 4/2007 | Nobuta | B41J 3/4071 358/1.13 |
| 2007/0103496 A1* | 5/2007 | Otani | B41J 2/04573 347/11 |
| 2008/0231649 A1 | 9/2008 | Kawabata et al. | |
| 2009/0231621 A1* | 9/2009 | Kuwahara | B41J 29/02 358/1.15 |
| 2009/0231623 A1* | 9/2009 | Kuwahara | B41J 29/02 358/1.15 |
| 2009/0244134 A1* | 10/2009 | Shinohara | B41J 2/2139 347/10 |
| 2010/0238460 A1* | 9/2010 | Nakayama | B41J 19/202 358/1.8 |
| 2011/0310138 A1* | 12/2011 | Mano | B41J 19/202 347/5 |
| 2012/0001974 A1* | 1/2012 | Mano | B41J 2/125 347/14 |
| 2014/0285556 A1* | 9/2014 | Otsuka | B41J 2/07 347/14 |

\* cited by examiner

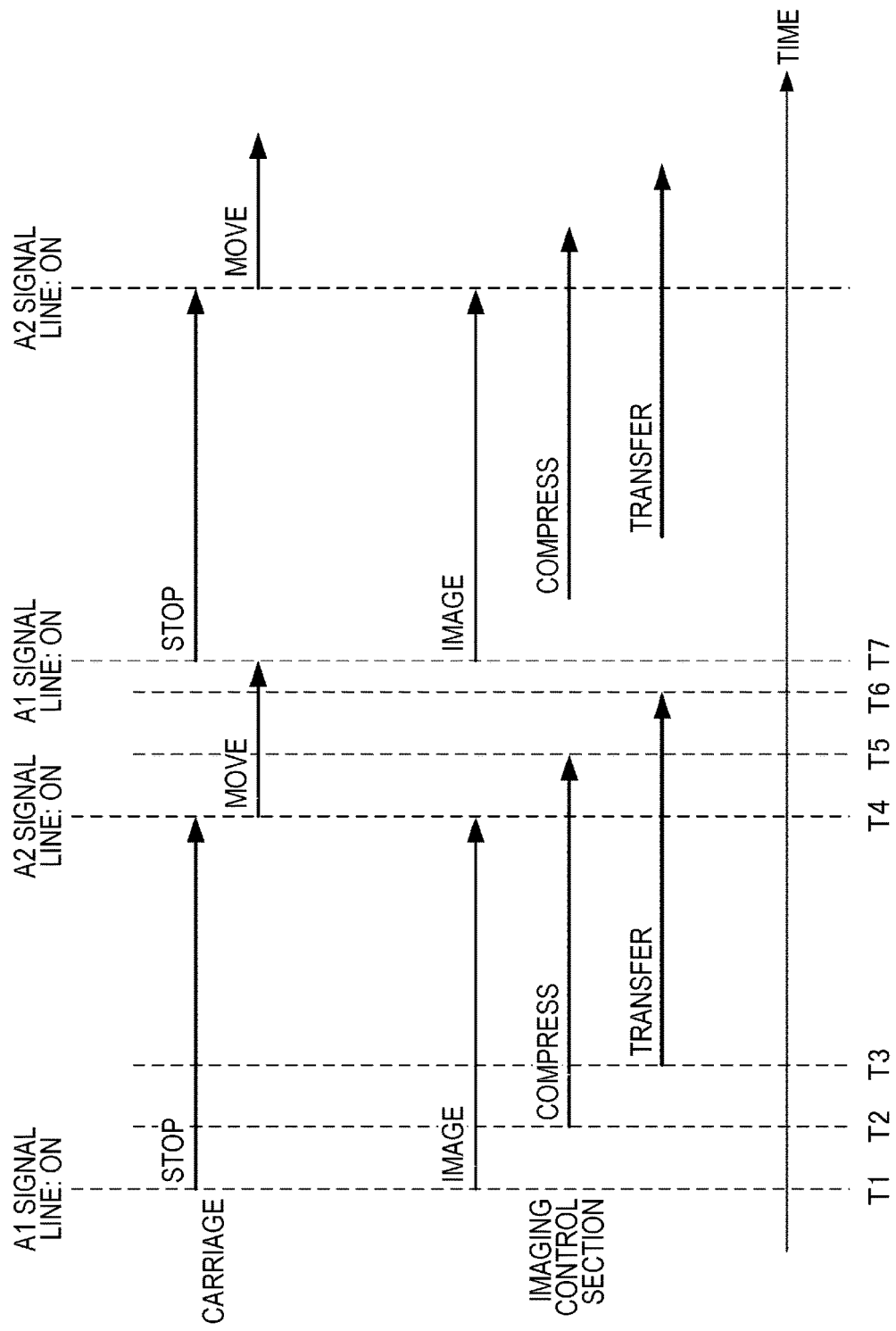

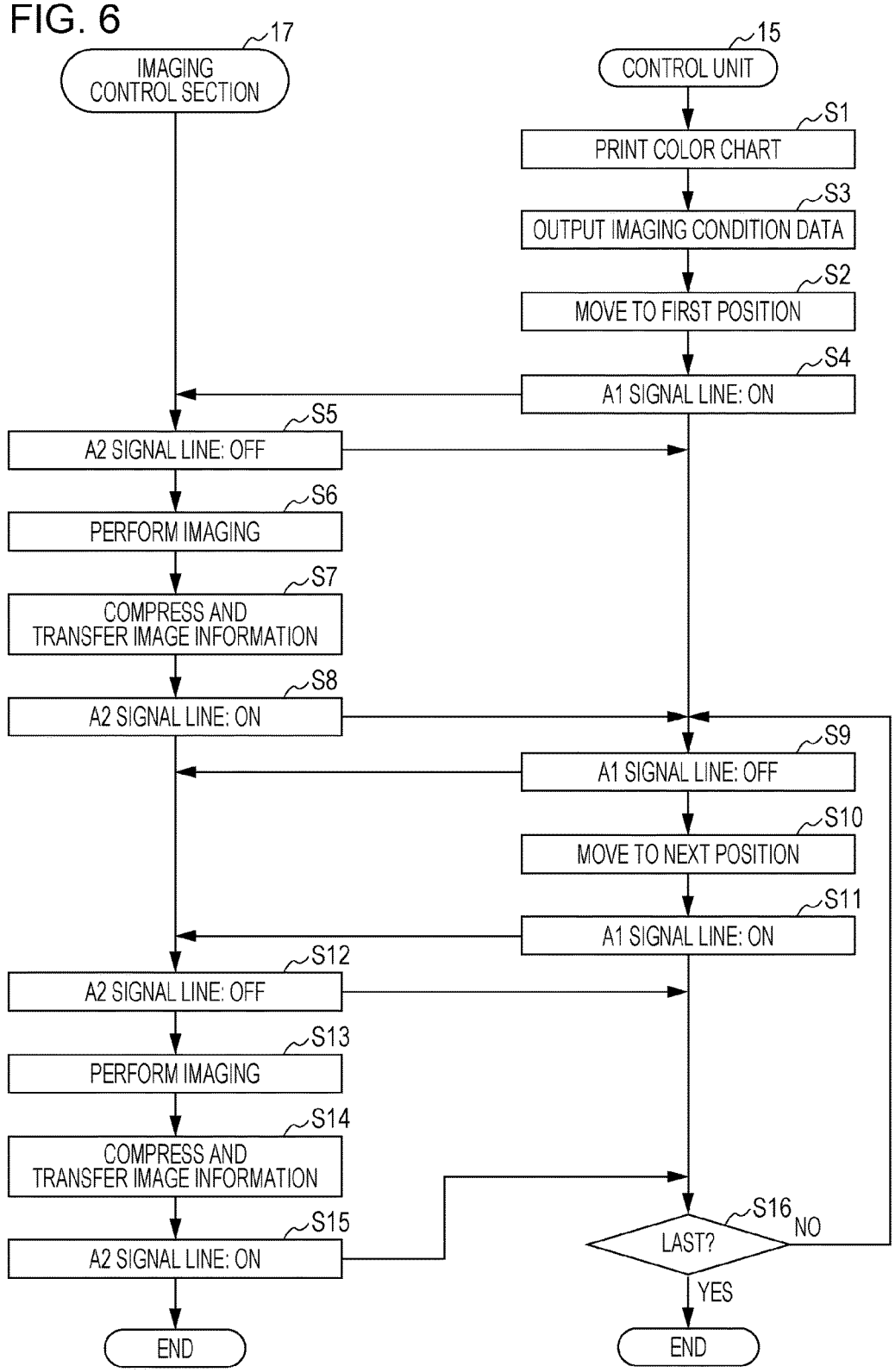

MEASURING APPARATUS AND PRINTING APPARATUS

BACKGROUND

1. Technical Field

The present invention relates to a measuring apparatus and a printing apparatus.

2. Related Art

There has been a printer that measures a printed test pattern and corrects a set value regarding printing processing based on a measurement result (for example, refer to JP-A-2008-229952).

An image forming apparatus disclosed in JP-A-2008-229952 discharges ink droplets from a recording head to perform printing. The image forming apparatus prints a plurality of adjustment patterns (test patterns) on a conveying belt that conveys a medium and measures the plurality of printed adjustment patterns. Further, based on a measurement result, the image forming apparatus corrects landing positions of ink droplets discharged from the recording head. The image forming apparatus includes a carriage on which a pattern reading sensor is disposed, and measures a plurality of adjustment patterns by using the pattern reading sensor while moving the carriage at a regular speed.

One of methods to measure a test pattern is a method in which a test pattern is imaged by an imaging apparatus. In this case, the imaging apparatus is disposed on a carriage and the carriage is moved to position the imaging area of the imaging apparatus over one test pattern. Under the condition where the carriage is stopped, the test pattern is then imaged by the imaging apparatus. Thereafter, the carriage is moved to position the imaging area over the next test pattern, and the test pattern is imaged similarly. In this way, by repeatedly moving and stopping the carriage, the imaging area is sequentially moved to be positioned over each test pattern, and the test pattern is imaged. Here, it is desirable to reduce the time taken for measuring test patterns by quickly moving and stopping the carriage.

SUMMARY

An advantage of some aspects of the invention is that a measuring apparatus and a printing apparatus capable of reducing the time taken for measurement are provided.

A measuring apparatus according to an aspect of the invention includes a carriage on which an imaging control section that controls imaging of an object is mounted, a movement control section that moves the carriage relative to the object, an image processing section that acquires image information, a first signal line that connects the imaging control section and the movement control section to each other, and a second signal line that connects the imaging control section and the image processing section to each other. A control signal is transmitted over the first signal line, and a data signal is transmitted over the second signal line.

In the aspect of the invention, a control signal is transmitted via the first signal line provided separately from the second signal line over which a data signal is transmitted.

According to this configuration, a control signal and a data signal can be separately transmitted, and it is also possible to transmit a control signal while transmitting a data signal containing a large amount of information. Therefore, the measuring apparatus may be efficiently controlled.

In addition, the first signal line may include a signal line that outputs a first control signal from the movement control section to the imaging control section, the first control signal being the control signal indicating whether the carriage is moving, and a signal line that outputs a second control signal from the imaging control section to the movement control section, the second control signal being the control signal indicating whether imaging is being performed.

According to this configuration, since the first signal line includes a plurality of signal lines, for example, a configuration in which the movement control section outputs the first control signal by switching one signal line to the H level or the L level and the imaging control section outputs the second control signal by switching the other signal line to the H level or the L level may be employed. That is, detecting the state of each signal line enables the state of the measuring apparatus to be confirmed.

In the measuring apparatus according to the aspect of the invention, it is preferable that the movement control section move the carriage when a second control signal indicating completion of imaging is input, and, upon moving the carriage to an imaging position, output the first control signal indicating completion of movement of the carriage, via the first signal line to the imaging control section, and the imaging control section image the object when the first control signal indicating completion of movement of the carriage is input and, upon completion of imaging, output the second control signal indicating completion of imaging, via the first signal line to the movement control section.

According to the aspect of the invention, upon moving the carriage to an imaging position, the movement control section outputs the first control signal indicating completion of movement of the carriage, via the first signal line to the imaging control section. The imaging control section then images the object when the first control signal is input, and, upon completion of imaging, outputs a second control signal indicating completion of imaging, via the first signal line to the movement control section. The movement control section then moves the carriage to the next imaging position when the second control signal is input. In this way, the measuring apparatus repeatedly performs relative movement and stopping of the carriage to image an object at a plurality of imaging positions.

According to this configuration, the imaging control section may be inhibited from imaging an object while the carriage is moving, and the movement control section may be inhibited from moving the carriage while the imaging control section is imaging an object. Thus, imaging processing may be inhibited from failing.

In addition, the second signal line may transmit the image information as the data signal and may be capable of transmitting a large amount of information per unit time compared with the first signal line.

According to this configuration, image information can be transmitted via the second signal line capable of transmitting a large amount of information per unit time while a control signal is transmitted via the first signal line to control the measuring apparatus. Therefore, the measuring apparatus may be efficiently controlled in a shorter time.

Accordingly, for example, when processing in which relative movement and stopping of the carriage are repeatedly performed and a plurality of test patterns formed in an object are imaged is performed, the time taken for the processing may be reduced.

In the measuring apparatus according to the aspect of the invention, it is preferable that the movement control section move the carriage while the data signal is being transmitted via the second signal line.

In the aspect of the invention, since the first signal line, over which a control signal is transmitted, is provided separately from the second signal line, over which a data signal is transmitted, the control signal can be transmitted while the data signal is being transmitted. Therefore, the movement control section can move the carriage while a data signal is being transmitted.

Thus, for example, compared with the case where the movement control section moves the carriage to the next imaging position after the imaging control section has output all of the image information obtained by imaging an object at an imaging position, the time from when the imaging control section images an object until when the movement control section moves the carriage to the next imaging position may be reduced.

In the measuring apparatus according to the aspect of the invention, it is preferable that the imaging control section compress the image information to perform output to the image processing section, and the movement control section move the carriage while the imaging control section is compressing the image information.

In the aspect of the invention, since the first signal line, over which a second control signal indicating completion of imaging is transmitted, is provided separately from the second signal line, over which image information is transmitted, the imaging control section can output a second control signal indicating completion of imaging to the movement control section while compressing and outputting image information. Therefore, the movement control section can move the carriage while image information is being compressed.

Thus, for example, compared with the case where the movement control section moves the carriage to the next imaging position after the imaging control section has compressed all of the image information obtained by imaging an object at an imaging position, the time from when the imaging control section images an object until when the movement control section moves the carriage to the next imaging position may be reduced.

In the measuring apparatus according to the aspect of the invention, it is preferable that the image processing section collectively output plural pieces of imaging condition data for a plurality of imaging positions as the data signal via the second signal line to the imaging control section, and the imaging control section include a storage section that stores the plural pieces of imaging condition data, and perform imaging processing based on imaging condition data at an imaging position out of the plural pieces of imaging condition data.

For example, in the case where each time the moving control section moves the carriage to an imaging position, the image processing section outputs imaging condition data corresponding to the imaging position via the second signal line to the imaging control section, every time when the carriage moves to an imaging position, the imaging control section needs to image an object after an imaging condition has been output.

In contrast, according to the aspect of the invention, the imaging control section can collectively acquire plural pieces of imaging condition data in advance, and therefore can quickly image an object when the carriage has moved to an imaging position. Thus, the time taken for a series of processing operations for imaging an object at a plurality of imaging positions may be reduced.

A printing apparatus according to another aspect of the invention includes the measuring apparatus as described above and an image forming section that forms an image on the object.

In this aspect of the invention, a printing apparatus including an image forming section is provided with the measuring apparatus as described above. With the measuring apparatus as described above, for example, measurement of a plurality of test patterns may be quickly performed, and therefore, with the printing apparatus, correction of colors and the like of an image formed by the image forming section may be quickly performed.

BRIEF DESCRIPTION OF THE DRAWINGS

The invention will be described with reference to the accompanying drawings, wherein like numbers reference like elements.

FIG. 5 is a chart illustrating timings for operation of a carriage and an imaging control section in the present embodiment.

FIG. 6 is a flowchart illustrating a measurement method in another embodiment according to the invention.

DESCRIPTION OF EXEMPLARY EMBODIMENTS

Figure 1:
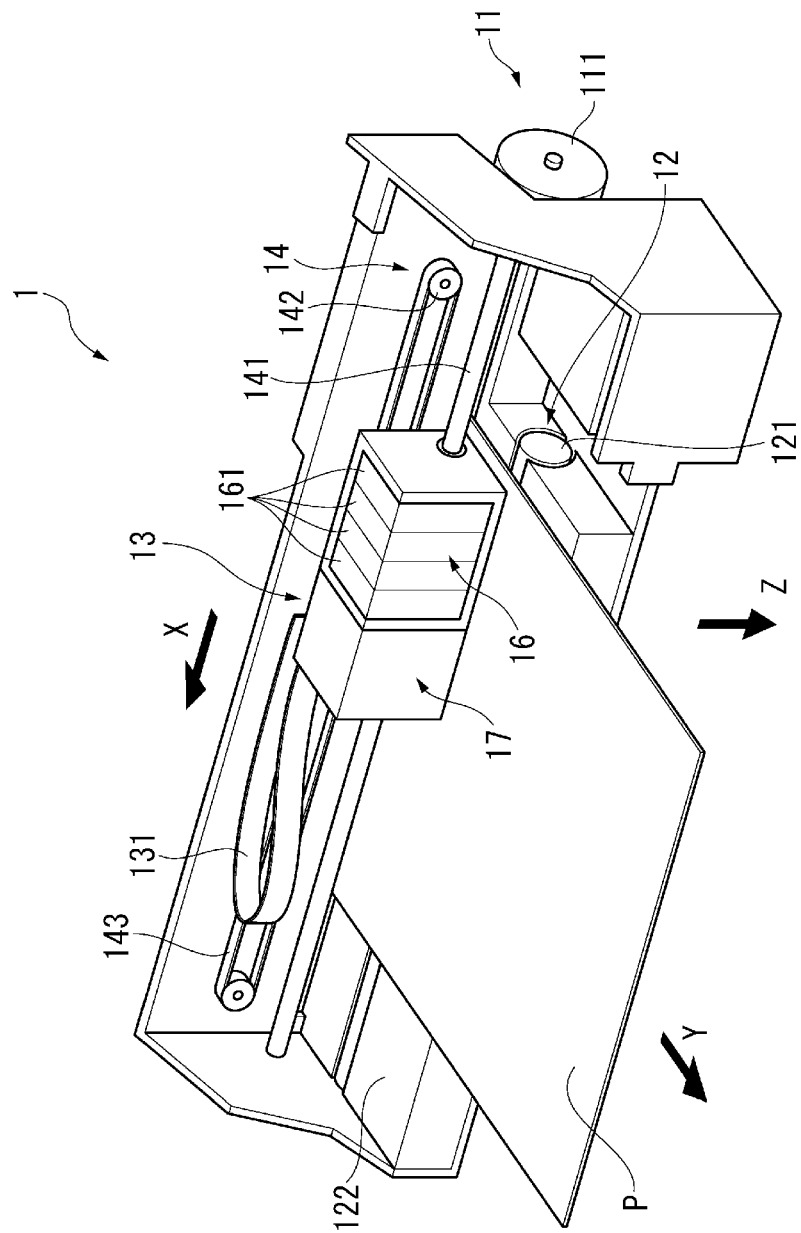
FIG. 1 is a perspective view illustrating an example an external configuration of a printer in an embodiment according to the invention.
Figure 2:
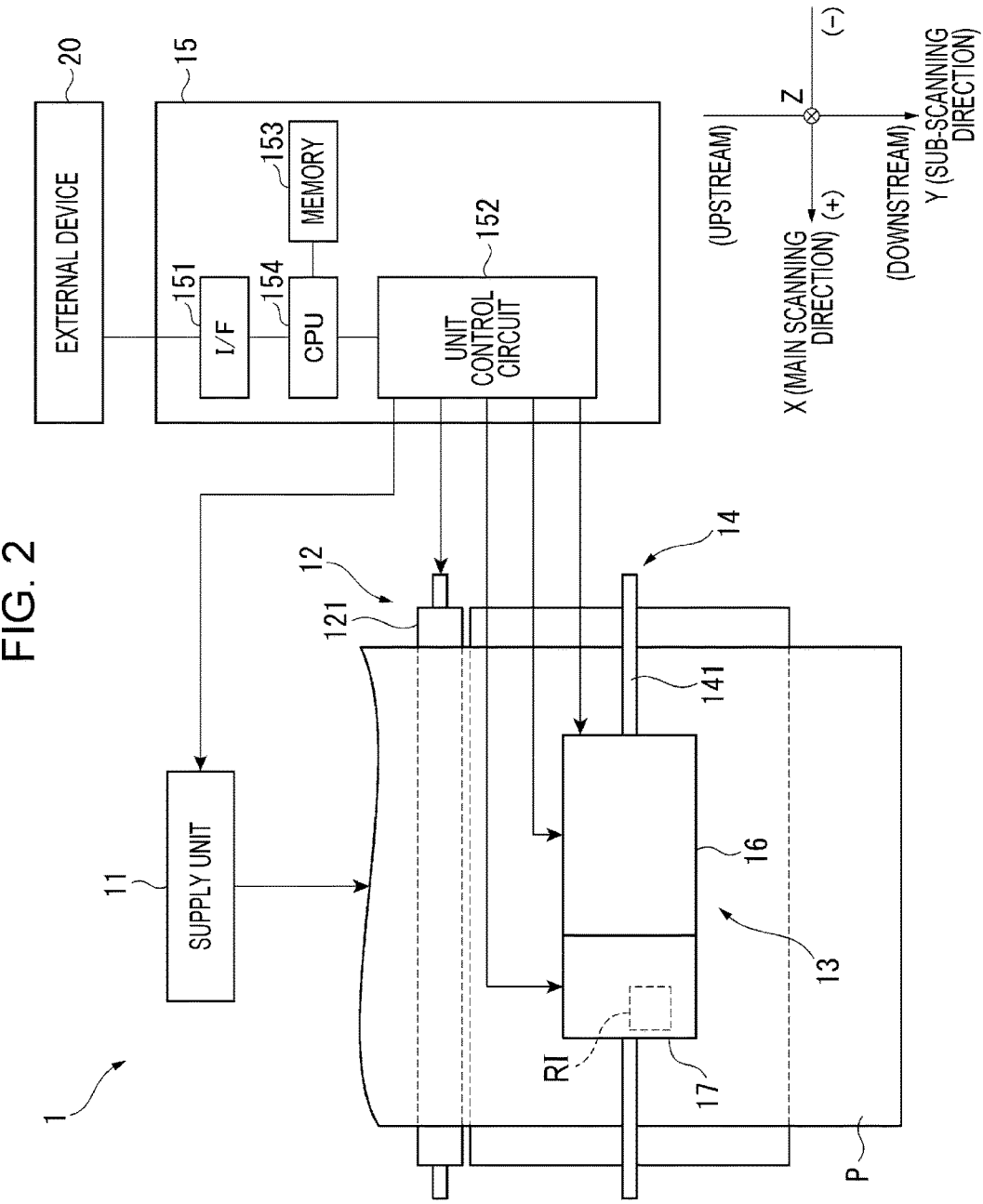
FIG. 2 is a block diagram illustrating a schematic configuration of a printer in the present embodiment.

Hereinafter, an embodiment according to the invention will be described with reference to the accompanying drawings. In the present embodiment, a printer 1 (ink jet printer) including a measuring apparatus will be described as an example of a printing apparatus according to the invention.
Schematic Configuration of Printer FIG. 1 is a perspective view illustrating an example of an external configuration of the printer 1 in the present embodiment. FIG. 2 is a block diagram illustrating a schematic configuration of the printer 1 in the present embodiment.

As illustrated in FIG. 1 and FIG. 2, the printer 1 includes a supply unit 11, a transport unit 12, a carriage 13 on which a printing section 16 and an imaging control section 17 are mounted, a carriage moving unit 14, and a control unit 15 (refer to FIG. 2). Note that all portions of the printer 1, except the printing section 16 provided on the carriage 13, correspond to the measuring apparatus according to the invention.

The printer 1 controls the units 11, 12, and 14 and the carriage 13 based on printing data input from, for example, an external device 20, such as a personal computer, to print an image on a medium P. In addition, the printer 1 in the present embodiment forms a color chart including a plurality of colorimetric color patches at a predetermined position on the medium P based on calibration printing data set in advance and images the color patches. Here, the printer 1 in the present embodiment detects color shifts, variations in density, the deviation of landing positions of ink droplets, and the like based on image information obtained by imaging the color patch and performs color correction, density correction, correction for landing positions of ink droplets, and the like based on the detection result.

Hereinafter, the configuration of each component of the printer 1 will be specifically described.

The supply unit 11 is a unit that supplies the medium P (paper is illustrated in the present embodiment), on which an image is to be formed, to an image formation position. The supply unit 11 includes, for example, a roll drive motor 112 (refer to FIG. 3), a roll drive train (not illustrated), and the like, and a roll body 111 (refer to FIG. 1) wrapped in the medium P can be loaded on the supply unit 11. Based on an instruction from the control unit 15, the roll drive motor 112 is rotationally driven, such that the rotational force of the roll drive motor 112 is transmitted via the roll drive train to the roll body 111. Thus, the roll body 111 rotates, such that the medium P wrapped over the roll body 111 is unwound and is supplied to the downstream side (+Y-direction) in the Y-direction (transport direction).

Note that the present embodiment illustrates the case where the medium P wrapped over the roll body 111 is supplied, but embodiments are not limited thereto. The medium P may be supplied by any supply method, for example, the medium P, such as paper loaded on a tray or the like, may be supplied, for example, on a per-piece basis by using a roller or the like.

The transport unit 12 transports the medium P supplied from the supply unit 11 along the Y-direction. The transport unit 12 has a configuration that includes a transport roller 121, a driven roller (not illustrated) that follows the transport roller 121 to, together with the transport roller 121, enable the medium P to be pinched therebetween, a transport motor 123 (refer to FIG. 3), and a platen 122.

Upon the transport motor 123 being driven by control of the control unit 15, a driving force from the transport motor 123 is transmitted to the transport roller 121. The transport roller 121 is rotationally driven by the driving force transmitted from the transport motor 123 to transport the medium P pinched between the transport roller 121 and the driven roller along the Y-direction. In addition, the platen 122 facing the carriage 13 is provided downstream (+Y-direction) of the transport roller 121 in the Y-direction.

The printing section 16, which is an image forming section that prints an image on the medium P, and the imaging control section 17 that images a predetermined imaging area RI on the medium P are mounted on the carriage 13.

The carriage 13 is provided to be capable of being moved along the main scanning direction (X-direction) crossing the Y-direction by the carriage moving unit 14. That is, the carriage 13 is provided to be capable of being moved relative to the medium P.

In addition, the printing section 16 is connected via a flexible circuit 131 to the control unit 15 and performs printing processing (image formation processing for the medium P) based on an instruction from the control unit 15. Furthermore, the imaging control section 17 is connected via the flexible circuit 131 to the control unit 15 and performs imaging processing based on an instruction from the control unit 15.

The printing section 16, in a portion thereof facing the medium P, discharges ink droplets onto the medium P to form an image on the medium P.

Ink cartridges 161 corresponding to a plurality of colors of ink are removably mounted on the printing section 16, and ink is supplied from each ink cartridge 161. In addition, nozzles (not illustrated) that discharge ink droplets are provided on the bottom surface of the printing section 16 (at the position facing the medium P) in such a manner as to correspond to a plurality of colors of the ink, respectively. Elements that discharge ink droplets, for example, piezoelectric elements or the like are disposed in the nozzles. When ink is supplied from the ink cartridges 161, the printing section 16 discharges ink droplets by driving piezoelectric elements or the like disposed in the nozzles.

Note that the present embodiment illustrates an example in which ink is supplied from the ink cartridges 161, but embodiments are not limited thereto. A configuration may be employed in which an ink tank having a large capacity compared with the ink cartridge 161 is mounted at a location other than in the carriage 13 and ink is supplied from the ink tank via a tube to the printing section 16.

Figure 3:
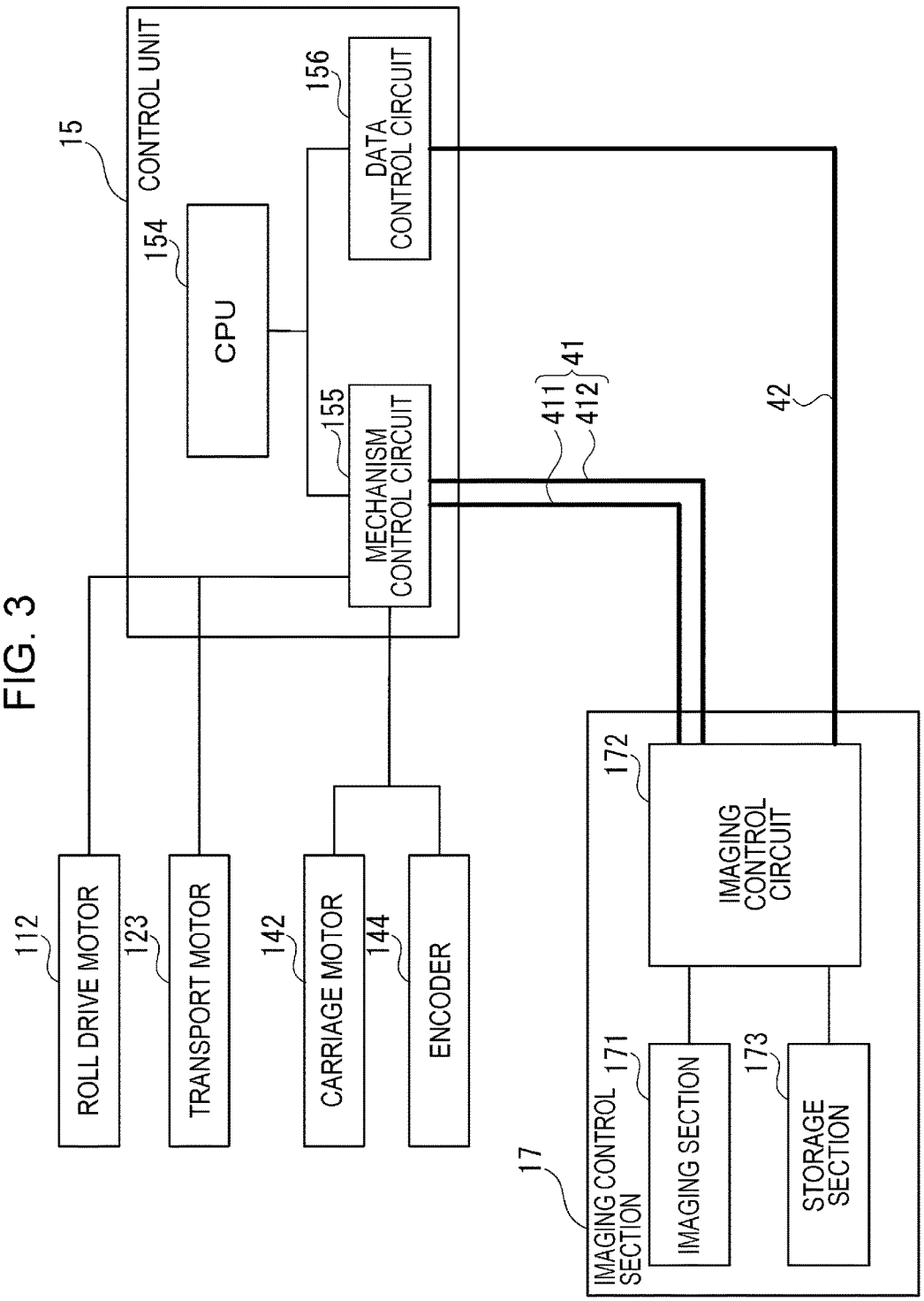
FIG. 3 is a block diagram illustrating a circuit configuration of a printer in the present embodiment.

The imaging control section 17, as illustrated in FIG. 3, includes an imaging section 171, an imaging control circuit 172 that controls the imaging section 171, and a storage section 173. The imaging section 171 includes a light source, an imaging element, and the like, which are not illustrated in the drawings, and images the imaging area RI of the medium P in such a way that the imaging area RI of the medium P is illuminated with light by the light source and the reflected light is captured by the imaging element. Note that an image sensor of any type, such as a charge-coupled device (CCD) or a complementary metal oxide semiconductor (CMOS), can be used as the imaging element.

With reference now to FIG. 1 and FIG. 2, the carriage moving unit 14 constitutes a moving mechanism that moves the carriage 13, and reciprocates the carriage 13 along the X-direction based on an instruction from the control unit 15.

The carriage moving unit 14 has a configuration that includes, for example, a carriage guide shaft 141, a carriage motor 142, a timing belt 143, and an encoder 144 (refer to FIG. 3).

The carriage guide shaft 141 is disposed along the X-direction and both ends thereof are fixed to, for example, a casing of the printer 1. The carriage motor 142 drives the timing belt 143. The timing belt 143 is supported substantially parallel to the carriage guide shaft 141, and part of the carriage 13 is connected to the timing belt 143. Upon the carriage motor 142 being driven based on an instruction from the control unit 15, the timing belt 143 travels forward and backward, and the carriage 13 connected to the timing belt 143 is guided by the carriage guide shaft 131 to reciprocate. The encoder 144 detects the position of the carriage 13 and outputs a detection signal to the control unit 15.

Configuration of Control Unit

Next, the control unit 15 will be described.

The control unit 15, as illustrated in FIG. 2, has a configuration that includes an interface (I/F) 151, a unit control circuit 152, memory 153, and a central processing unit (CPU) 154.

The I/F 151 inputs printing data input from the external device 20 to the CPU 154.

The unit control circuit 152 includes a control circuit that controls the supply unit 11, the transport unit 12, the printing section 16, the imaging control section 17, and the carriage moving unit 14 and controls operation of each unit based on an instruction signal from the CPU 154. Note that a control circuit for each unit may be provided separately from the control unit 15 and be connected to the control unit 15.

In the memory 153, various programs for controlling operation of the printer 1 and various types of data are stored.

As the various types of data, for example, chart image data that is the original image data for printing a color chart, plural pieces of imaging condition data indicating imaging conditions for each of the color patches of a color chart, printing profile data in which the discharge amount and the like of each ink for color data included as printing data are stored, and the like are listed.

Circuit Configuration of Printer

Next, the circuit configuration of the printer 1 will be described.

As illustrated in FIG. 3, the control unit 15 includes a mechanism control circuit 155 as a movement control section controlled by the CPU 154 and a data control circuit 156 as an image processing section. Note that the mechanism control circuit 155 and the data control circuit 156 are part of a control circuit constituting the unit control circuit 152.

Here, the mechanism control circuit 155 and the imaging control circuit 172 of the imaging control section 17 are connected to each other by an A signal line 41 as a first signal line over which a control signal is transmitted. The A signal line 41 has a configuration that includes an A1 signal line 411 and an A2 signal line 412. In the present embodiment, the A1 signal line 411 and the A2 signal line 412 are serial lines and are each fixed to the H level or the L level in accordance with a signal to be transmitted thereover.

In addition, the data control circuit 156 and the imaging control circuit 172 are connected to each other by a B signal line 42 as a second signal line over which a data signal is transmitted. The B signal line 42 is a parallel line over which encoded data is transmitted and over which, for example, data is transmitted in accordance with a communication standard of Ethernet (registered trademark) or the like.

Separating the first signal line, over which a control signal is transmitted, from the second signal line, over which a data signal is transmitted, enables the control signal and the data signal to be transmitted separately, and it is also possible to transmit the control signal while transmitting the data signal containing a large amount of information. Therefore, a measuring apparatus may be efficiently controlled.

Note that the B signal line 42 may employ a line other than the parallel line and, for example, may have a configuration using another standard, such as universal serial bus (USB). In the present embodiment, since image information, imaging condition data, or the like, for example, is handled as a data signal, the B signal line 42 needs to transmit a larger amount of information than the A signal line 41. Therefore, it is desirable that, compared with the A signal line 41, the B signal line 42 employ a standard that permits a large amount of information per unit time to be transmitted. Use of the second signal line capable of transmitting a large amount of information per unit time enables image information or the like to be transmitted in a shorter time while a control signal is transmitted via the first signal line to control a measuring apparatus. Therefore, the measuring apparatus may be efficiently controlled.

The mechanism control circuit 155 controls the transport motor 123 and the carriage motor 142 to move the medium P and the carriage 13 relative to each other. The mechanism control circuit 155 also acquires a detection signal output from the encoder 144 and detects a moving state or a stopped state of the carriage 13 based on the detection signal. The mechanism control circuit 155 also outputs a first control signal, which is a control signal indicating whether the carriage 13 is moving or is stopped relative to the medium P, via the A1 signal line 411 to the imaging control circuit 172.

The imaging control circuit 172 mounted on the carriage 13 controls the imaging section 171 to cause the imaging section 171 to image the imaging area RI of the medium P. The imaging control circuit 172 also outputs a second control signal, which is a control signal indicating whether the imaging section 171 is performing imaging, via the A2 signal line 412 to the mechanism control circuit 155. The imaging control circuit 172 also compresses image information obtained by imaging by the imaging section 171 and outputs the compressed information via the B signal line 42 to the data control circuit 156.

The data control circuit 156 outputs imaging condition data read from the memory 153 by the CPU 154, via the B signal line 42 to the imaging control circuit 172. The data control circuit 156 also acquires image information obtained by imaging by the imaging control section 17.

Measurement Method

Next, a measurement method in the printer 1 in the present embodiment will be described with reference to the drawings.

Figure 4:
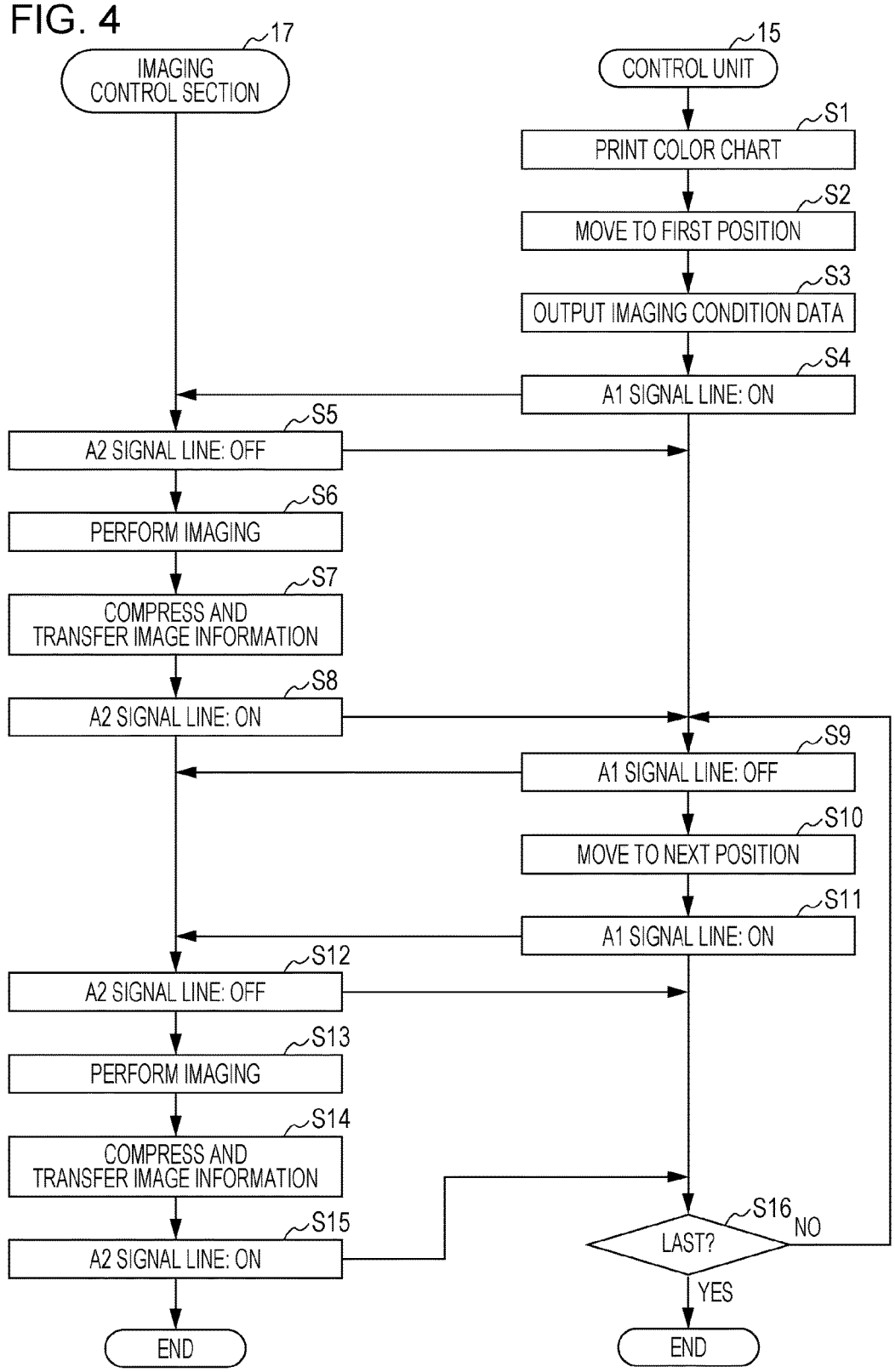
FIG. 4 is a flowchart illustrating a measurement method in the present embodiment.

FIG. 4 is a flowchart illustrating a measurement method in the printer 1.

Here, as measurement processing by the printer 1, an example in which measurement processing for a plurality of color patches printed by, for example, the printing section 16 is performed will be described. Note that, at the time when measurement processing begins, the A1 signal line 411 is set to the L level and the A2 signal line 412 is set to the H level.

Upon receiving an instruction to perform measurement processing by, for example, an operation of the user or input from the external device 20, the printer 1 prints a color chart on the medium P (step S1).

That is, the mechanism control circuit 155 of the unit control circuit 152 controls the roll drive motor 112 and the transport motor 123, based on a direction from the CPU 154, to cause the medium P to be transported to a predetermined position of the platen 122. A printing control circuit (not illustrated) of the unit control circuit 152 then controls the printing section 16 to print a color chart at a predetermined position of the transported medium P. This color chart is printed based on the original image data (chart image data) of a color chart stored in advance in the memory 153.

Here, a color chart is arranged to include a plurality of color patches. For example, a color chart is arranged in such a manner that one patch group consists of a plurality of (N) color patches aligned in the X-direction, and a plurality of (M) patch groups are aligned in the Y-direction. That is, N×M color patches are disposed.

Here, the imaging area RI is larger than the area of one color patch, and at least one color patch is included within the imaging area RI when imaging processing is being performed by the imaging section 171. That is, the position of each color patch in the medium P corresponds to the imaging position according to the invention.

Next, based on an instruction from the CPU 154, the mechanism control circuit 155 drives the carriage motor 142, the roll drive motor 112, and the transport motor 123 to move the carriage 13 and the medium P relative to each other to position the imaging area RI over a color patch to be first imaged in a color chart printed on the medium P (step S2). The color patch to be first imaged is a color patch that is the first in the −X-direction and the first in the −Y-direction.

Upon detecting that the carriage motor 142 has stopped, based on a detection signal of the encoder 144, the mechanism control circuit 155 then notifies the CPU 154 that the carriage 13 has stopped.

Next, based on an instruction from the CPU 154, the data control circuit 156 of the unit control circuit 152 collectively outputs plural pieces of imaging condition data stored in the memory 153 via the B signal line 42 to the imaging control section 17 (step S3). The imaging condition data is, for example, the number of imaging operations specified for each color patch.

Upon acquiring the plural pieces of imaging condition data output from the data control circuit 156, the imaging control circuit 172 of the imaging control section 17 stores them in the storage section 173.

Next, the mechanism control circuit 155 switches the A1 signal line 411 to the H level (on-state) (step S4). Here, switching the A1 signal line 411 to the on-state corresponds to outputting, to the imaging control circuit 172, a first control signal indicating that the carriage 13 is stopped.

Upon detecting that the A1 signal line 411 is in the on-state, that is, upon receiving the first control signal indicating that carriage 13 is stopped, the imaging control circuit 172 switches the A2 signal line 412 to the L level (off-state) (step S5). Here, switching the A2 signal line 412 to the off-state corresponds to outputting, to the mechanism control circuit 155, a second control signal indicating that imaging section 171 is performing imaging. Here, the mechanism control circuit 155 does not move the carriage 13 while the A2 signal line 412 is in the off-state.

Next, the imaging control circuit 172 reads imaging control data for a color patch to be imaged from the plural pieces of imaging condition data stored in the storage section 173. Based on the read imaging condition data, the imaging control circuit 172 then performs imaging processing in which the color patch to be imaged is imaged by the imaging section 171 and image information is acquired (step S6). Here, imaging of a color patch is performed a number of times in accordance with the imaging condition data, and the acquired image information is sequentially stored in the storage section 173.

While performing imaging processing, the imaging control circuit 172 also sequentially reads image information stored in the storage section 173, compresses the read image information, and transfers the compressed image information via the B signal line 42 to the data control circuit 156 (step S7).

Upon completion of the imaging processing, the imaging control circuit 172 then switches the A2 signal line 412 to the H level (on-state) (step S8). Here, switching the A2 signal line 412 to the on-state corresponds to outputting, to the mechanism control circuit 155, a second control signal indicating that the imaging processing is complete. Note that the second control signal is output even during compression processing and transfer processing of image information.

Upon detecting that the A2 signal line 412 is in the on-state, that is, upon receiving the second control signal indicating that imaging processing is complete, the mechanism control circuit 155 switches the A1 signal line 411 to the off-state (step S9). Here, the imaging control section 17 does not perform imaging processing while the A1 signal line 411 is in the off-state.

Next, the mechanism control circuit 155 drives the carriage motor 142 to move the carriage 13 to position the imaging area RI over a color patch to be next imaged (step S10). The color patch to be next imaged is a color patch positioned next to the current color patch in the +X-direction.

Upon detecting that the carriage motor 142 has stopped, based on a detection signal of the encoder 144, the mechanism control circuit 155 then switches the A1 signal line 411 to the on-state (step S11).

Upon detecting that the A1 signal line 411 is in the on-state, the imaging control circuit 172 switches the A2 signal line 412 to the off-state (step S12).

Next, the imaging control circuit 172 reads imaging condition data for a color patch to be imaged from the plural pieces of imaging condition data stored in the storage section 173. Based on the read imaging condition data, the imaging control circuit 172 then performs imaging processing of the color patch to be imaged (step S13).

In addition, while performing imaging processing, the imaging control circuit 172 performs processing similar to that in step S7 and transfers compressed image information via the B signal line 42 to the data control circuit 156 (step S14).

Upon completion of the imaging processing, the imaging control circuit 172 then switches the A2 signal line 412 to the on-state (step S15).

Upon detecting that the A2 signal line 412 is in the on-state, the mechanism control circuit 155 determines whether the color patch imaged immediately before is the last color patch to be measured (step S16).

If the determination result in step S16 is No, the mechanism control circuit 155 returns the process to step S9. Thus, steps S9 to S16 are repeatedly performed until imaging processing has been performed for all of the color patches of the color chart. Note that, in step S10, when the imaging area RI is positioned over the Nth color patch from the −X-direction side, the mechanism control circuit 155 drives the carriage motor 142, the roll drive motor 112, and the transport motor 123 to move the carriage 13 and the medium P relative to each other to position the imaging area RI over a color patch that is positioned next to the current color patch in the +Y-direction and is the first from the −X-direction side. When moving the carriage 13 and the medium P relative to each other, the mechanism control circuit 155 switches the A1 signal line 41 to the on-state after detecting not only the carriage 13 being stopped but also the medium P being at rest. Whether the medium P is at rest can be determined by detecting the driving state of the transport motor 123 or the rotation state of the transport roller 121. Each time step S10 is performed, the carriage 13 is moved, so that the imaging area RI is positioned over a color patch that is positioned next to the current color patch in the +X-direction.

Otherwise, if the determination result in step S16 is Yes, that is, if imaging processing is complete for all of the N×M color patches, the mechanism control circuit 155 notifies the CPU 154 accordingly. The CPU 154 then completes the measurement processing after the data control circuit 156 has acquired all of the image information transferred from the imaging control circuit 172.

Timings for Operations

Next, an example of operation timings of the carriage 13 and the imaging control section 17 will be described with reference to a timing chart in FIG. 5.

In this example, as illustrated in FIG. 5, first, when the carriage 13 stops at a timing T1, the A1 signal line 411 enters the on-state and the imaging control section 17 performs imaging processing.

At a timing T2, the imaging control section 17 then starts compression processing for image information acquired by imaging processing. Furthermore, at a timing T3, the compressed image information is transferred via the B signal line 42 to the data control circuit 156.

Upon completion of the imaging processing at a timing T4, the A2 signal line 412 enters the on-state and the mechanism control circuit 155 moves the carriage 13 to the next measurement position. Note that, in this example, the compression processing and the transfer processing for image information are not complete at the point of the timing T4 and are performed until timings T5 and T6 preceding a timing T7 at which the carriage 13 stops. That is, in the situation that the compression processing and the transmission processing are being performed, the carriage 13 is moving.

When the carriage 13 stops at the timing T7, the A1 signal line 411 again enters the on-state, and the imaging control section 17 performs imaging processing. In this way, the movement and stopping of the carriage 13 and imaging processing, compression processing, and transfer processing by the imaging control section 17 are repeatedly performed until measurement is complete for all of the color patches.

Operations and Advantages of Embodiment

According to the present embodiment, the imaging control circuit 172 can determine whether the carriage 13 is moving, by detecting whether the A1 signal line 411 is at the H level or at the L level. Therefore, for example, compared with the case where a signal output from the mechanism control circuit 155 indicating whether the carriage 13 is moving is encoded and is transmitted via the B signal line 42, over which image information is transmitted, to the imaging control circuit 172, and the imaging control circuit 172 performs decoding processing on the transmitted signal to determine whether the carriage 13 is moving, the determination may be performed quickly. In addition, the mechanism control circuit 155 can determine whether imaging is being performed, by detecting whether the A2 signal line 412 is at the H level or the L level. Therefore, for example, compared with the case where a signal output from the imaging control circuit 172 indicating whether imaging is being performed is encoded and is transmitted via the B signal line 42, over which image information is transmitted, to the mechanism control circuit 155, and the mechanism control circuit 155 performs decoding processing on the transmitted signal to determine whether imaging is being performed, the determination may be performed quickly. Accordingly, the time to perform measurement processing may be reduced.

According to the present embodiment, in measurement processing, the imaging control section 17 may be inhibited from performing imaging processing while the carriage 13 is moving, and the mechanism control circuit 155 is inhibited from moving the carriage 13 while the imaging control section 17 is performing imaging processing. Therefore, imaging processing may be inhibited from failing.

In the present embodiment, since the A1 signal line 411, over which a first control signal indicating completion of imaging is transmitted, is provided separately from the B signal line 42, over which image information is transmitted, the imaging control circuit 172 can output a first control signal indicating completion of imaging to the mechanism control circuit 155 while compressing and outputting image information. Therefore, the mechanism control circuit 155 can move the carriage 13 while image information is being compressed and transmitted.

According to this configuration, compared with the case where the mechanism control circuit 155 moves the carriage 13 over the next color patch after the imaging control section 17 has compressed and output all of the image information obtained by imaging the current color patch, the time from when the imaging control section 17 images a color patch until when the mechanism control circuit 155 moves the carriage 13 over the next color patch may be reduced.

For example, in the case where each time the mechanism control circuit 155 moves the carriage 13 over a color patch to be imaged, the data control circuit 156 outputs imaging condition data corresponding to the color patch via the B signal line 42 to the imaging control section 17, the following problem arises. That is, every time when the carriage 13 is moved over a color patch to be imaged, the imaging control section 17 needs to image the color patch after imaging condition data has been output.

In contrast, according to the present embodiment, since the imaging control section 17 can collectively acquire plural pieces of imaging condition data in advance, the imaging control section 17 can quickly image a color patch to be imaged when the carriage 13 is moved over the color patch. Thus, the time taken for measurement processing may be reduced.

According to the present embodiment, the time taken for measurement processing may be reduced, and therefore color correction, density correction, correction for landing positions of ink droplets, and the like of an image printed by the printing section 16 may be quickly performed based on a measurement result.

Other Embodiments

It is to be noted that the invention is not limited to the foregoing embodiment, and modifications, improvements, and the like within the scope in which advantages of the invention may be achieved are included in the invention.

For example, in the foregoing embodiment, transfer of plural pieces of imaging condition data by the data control circuit 156 is performed after the imaging area RI has been positioned over a color patch to be first imaged, but embodiments are not limited this. That is, the transfer may be performed before the imaging area RI is positioned over a color patch to be first imaged.

FIG. 6 is a flowchart illustrating measurement processing in another embodiment in question.

In this measurement processing, steps S1 to S16 are performed. Processing of steps S1 to S16 is the same as processing of steps S1 to S16 in the embodiment, respectively, and therefore description of the processing of each step is omitted.

In this measurement processing, after a color chart is printed in step S1, the data control circuit 156 collectively outputs plural pieces of imaging condition data via the B signal line 42 to the imaging control circuit 172 (step S3).

After step S3, the mechanism control circuit 155 then moves the carriage 13 to position the imaging area RI over a color patch to be first imaged (step S2).

In addition, in the foregoing embodiment and the other embodiment, the data control circuit 156 collectively outputs plural pieces of imaging condition data to the imaging control circuit 172, but embodiments are not limited to this.

For example, the data control circuit 156 may output plural pieces of imaging condition data in the units of a patch group consisting of color patches aligned in the X-direction. In this case, when the carriage 13 moves from the Nth color patch from the −X-direction side in the current patch group to a color patch that is the first color patch from the −X-direction side in a patch group that is positioned next to the current patch group in the +Y-direction, the data control circuit 156 may output plural pieces of imaging condition data corresponding to the patch group as the movement destination. In the case where the carriage 13 is moved in such a manner, the movement distance is long and the movement time is long compared with the case where the carriage 13 is moved to a color patch in the same patch group. This enables the data control circuit 156 to transfer imaging condition data via the B signal line 42 while the carriage 13 is moving, making it possible to alleviate an issue of an increase in the time taken for measurement processing caused by transfer of imaging condition data.

Note that each time the carriage 13 moves over a color patch, the data control circuit 156 may output imaging condition data corresponding to the color patch to the imaging control circuit 172. However, collectively outputting imaging condition data or outputting imaging condition data on a per-patch group basis can more reduce measurement processing and therefore is preferable.

In the foregoing embodiment, the A signal line 41 has a configuration that includes the A1 signal line 411 and the A2 signal line 412, but embodiments are not limited thereto. For example, the A signal line 41 may be composed of a single signal line.

In this case, for example, the signal line is controlled as follows. That is, at the time when measurement processing begins, the signal line is set to the on-state. Then, the mechanism control circuit 155 sets the signal line to the off-state to move the carriage 13 to an imaging position. In this period, the imaging control circuit 172 is unable to set the signal line to the on-state. Upon the carriage 13 stopping, the mechanism control circuit 155 then sets the signal line to the on-state. When the signal line is set to the on-state by the mechanism control circuit 155, the imaging control circuit 172 sets the signal line to the off-state and performs imaging processing. In this period, the mechanism control circuit 155 is unable to set the signal line to the on-state. Then, upon completing the imaging processing, the imaging control circuit 172 sets the signal line to the on-state. When the signal line is set to the on-state by the imaging control circuit 172, the mechanism control circuit 155 sets the signal line to the off-state and moves the carriage 13 to the next imaging position. That is, the mechanism control circuit 155 switches the signal line from the off-state to the on-state to inform the imaging control circuit 172 that the carriage 13 has stopped, and the imaging control circuit 172 sets the signal line to the off-state and performs imaging processing. In addition, the imaging control circuit 172 switches the signal line from the off-state to the on-state to inform the mechanism control circuit 155 that imaging processing is complete, and the mechanism control circuit 155 sets the signal line to the off-state and moves the carriage 13 to the next imaging position. That is, the mechanism control circuit 155 and the imaging control circuit 172 each switch the signal line from the off-state to the on-state to inform one that processing of the other is complete, and switch the signal line to the off-state to enable one to recognize that the other is performing processing.

Note that it may be determined that the signal line is in the on-state when one is performing processing and signal line is in the off-state when the other is performing processing. In this case, which of one and the other is performing processing is determined only by capturing the state of the signal line, and therefore it is easily determined whether processing is able to be performed. In addition, switching between the on-state and the off-state makes it possible to recognize completion of processing of one or the other control circuit.

In the foregoing embodiment, the mechanism control circuit 155 moves the carriage 13 while the imaging control circuit 172 is performing compression processing and transfer processing of image information, but embodiments are not limited to this. For example, the mechanism control circuit 155 may move the carriage 13 after compression processing is complete or after compression processing and transfer processing are complete. However, moving the carriage 13 while performing compression processing and transfer processing can more reduce the time taken for measurement processing and therefore is preferable.

In the foregoing embodiment, in the measurement processing, the carriage 13 is moved, such that the carriage 13 is moved relative to the medium P, but embodiments are not limited to this. For example, under the condition where the carriage 13 is stationary, the mechanism control circuit 155 may control the roll drive motor 112 and the transport motor 123 to move the medium P, such that the carriage 13 is moved relative to the medium P.

In addition, the specific configuration in carrying out the invention may be changed to another configuration or the like as appropriate within the scope in which advantages of the invention may be achieved.

This application claims priority under 35 U.S.C. § 119 to Japanese Patent Application No. 2017-029696, filed Feb. 21, 2017 and NO. 2017-204205, filed Oct. 23, 2017. The entire disclosure of Japanese Patent Application No. 2017-029696 and NO. 2017-204205 are hereby incorporated herein by reference.

What is claimed is:

1. A measuring apparatus comprising:
   a carriage;
   an imaging control section mounted to the carriage and configured to image an imaging area of an object to generate image information;
   a movement control section configured to move the carriage relative to the object;
   an image processing section configured to process the image information;
   a first signal line that connects the imaging control section and the movement control section to each other and is configured to transmit a control signal; and
   a second signal line that connects the imaging control section and the image processing section to each other and is configured to transmit a data signal.

2. The measuring apparatus according to claim 1,
   wherein the first signal line includes
   a signal line configured to output a first control signal from the movement control section to the imaging control section, the first control signal being the control signal indicating whether the carriage is moving, and
   a signal line configured to output a second control signal from the imaging control section to the movement control section, the second control signal being the control signal indicating whether imaging is being performed.

3. The measuring apparatus according to claim 2,
   wherein the movement control section
   is configured to move the carriage when the second control signal indicating completion of imaging is input, and upon moving the carriage to an imaging position, output the first control signal indicating completion of movement of the carriage, via the first signal line to the imaging control section, and wherein the imaging control section
is configured to image the object when the first control signal indicating completion of movement of the carriage is input, and upon completion of imaging, output the second control signal indicating completion of imaging, via the first signal line to the movement control section.

4. The measuring apparatus according to claim 1,
wherein the second signal line is configured to transmit the image information as the data signal and is configured to transmit more information per unit time than the first signal line.

5. The measuring apparatus according to claim 1,
wherein the movement control section is configured to move the carriage while the data signal is being transmitted via the second signal line.

6. The measuring apparatus according to claim 1,
wherein the imaging control section is configured to compress the image information to perform output to the image processing section, and
wherein the movement control section is configured to move the carriage while the imaging control section is compressing the image information.

7. The measuring apparatus according to claim 1,
wherein the image processing section is configured to collectively output plural pieces of imaging condition data for a plurality of imaging positions as the data signal via the second signal line to the imaging control section, and
wherein the imaging control section
includes a storage section that stores the plural pieces of imaging condition data, and
is configured to perform imaging processing based on imaging condition data at an imaging position out of the plural pieces of imaging condition data.

8. A printing apparatus comprising:
the measuring apparatus according to claim 1; and
an image forming section configured to form an image on the object.

9. A printing apparatus comprising:
the measuring apparatus according to claim 2; and
an image forming section configured to form an image on the object.

10. A printing apparatus comprising:
the measuring apparatus according to claim 3; and
an image forming section configured to form an image on the object.

11. A printing apparatus comprising:
the measuring apparatus according to claim 4; and
an image forming section configured to form an image on the object.

12. A printing apparatus comprising:
the measuring apparatus according to claim 5; and
an image forming section configured to form an image on the object.

13. A printing apparatus comprising:
the measuring apparatus according to claim 6; and
an image forming section configured to form an image on the object.

14. A printing apparatus comprising:
the measuring apparatus according to claim 7; and
an image forming section configured to form an image on the object.

15. A measuring apparatus comprising:
a carriage on which an imaging control section that controls imaging of an object is mounted;
a movement control section configured to move the carriage relative to the object;
an image processing section configured to acquire image information;
a first signal line that connects the imaging control section and the movement control section to each other; and
a second signal line that connects the imaging control section and the image processing section to each other,
wherein a control signal is transmitted over the first signal line,
a data signal is transmitted over the second signal line, and
the first signal line includes
a signal line configured to output a first control signal from the movement control section to the imaging control section, the first control signal being the control signal indicating whether the carriage is moving, and
a signal line configured to output a second control signal from the imaging control section to the movement control section, the second control signal being the control signal indicating whether imaging is being performed.

16. The measuring apparatus according to claim 15,
wherein the movement control section
is configured to move the carriage when the second control signal indicating completion of imaging is input, and upon moving the carriage to an imaging position, output the first control signal indicating completion of movement of the carriage, via the first signal line to the imaging control section, and
wherein the imaging control section
is configured to image the object when the first control signal indicating completion of movement of the carriage is input, and upon completion of imaging, output the second control signal indicating completion of imaging, via the first signal line to the movement control section.

17. The measuring apparatus according to claim 15,
wherein the second signal line is configured to transmit the image information as the data signal and is configured to transmit more information per unit time than the first signal line.

18. The measuring apparatus according to claim 15,
wherein the movement control section is configured to move the carriage while the data signal is being transmitted via the second signal line.

19. The measuring apparatus according to claim 15,
wherein the imaging control section is configured to compress the image information to perform output to the image processing section, and
wherein the movement control section is configured to move the carriage while the imaging control section is compressing the image information.

20. The measuring apparatus according to claim 15,
wherein the image processing section is configured to collectively output plural pieces of imaging condition data for a plurality of imaging positions as the data signal via the second signal line to the imaging control section, and
wherein the imaging control section
includes a storage section that stores the plural pieces of imaging condition data, and is configured to perform imaging processing based on imaging condition data at an imaging position out of the plural pieces of imaging condition data.

* * * * *